US012808712B2

(12) United States Patent
Osborn

(10) Patent No.: US 12,808,712 B2
(45) Date of Patent: Nov. 24, 2026

(54) PHOTOTHERMAL ACTUATION OF VIBRATIONS FOR MEASUREMENTS USING LASER DOPPLER VIBROMETERS

(71) Applicant: Government of the United States of America, as represented by the Secretary of Commerce, Gaithersburg, MD (US)

(72) Inventor: William Alexander Osborn, Gaithersburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 280 days.

(21) Appl. No.: 18/834,889

(22) PCT Filed: Jan. 31, 2023

(86) PCT No.: PCT/US2023/012053
§ 371 (c)(1),
(2) Date: Jul. 31, 2024

(87) PCT Pub. No.: WO2023/147199
PCT Pub. Date: Aug. 3, 2023

(65) Prior Publication Data

US 2025/0155275 A1 May 15, 2025

Related U.S. Application Data

(60) Provisional application No. 63/305,083, filed on Jan. 31, 2022.

(51) Int. Cl.
*G01H 9/00* (2006.01)
*G01N 29/02* (2006.01)
*G01N 29/24* (2006.01)

(52) U.S. Cl.
CPC ............ *G01H 9/00* (2013.01); *G01N 29/022* (2013.01); *G01N 29/2418* (2013.01)

(58) Field of Classification Search
CPC ..... G01N 29/022; G01N 29/2418; G01H 9/00
See application file for complete search history.

(56) References Cited

U.S. PATENT DOCUMENTS 9,804,193 B2 10/2017 Labuda et al.
2016/0169937 A1* 6/2016 Labuda .................. G01Q 20/02 850/6

FOREIGN PATENT DOCUMENTS

EP 1411341 A1 4/2004
EP 3779431 A1 2/2021
JP 5862997 B2 2/2016

OTHER PUBLICATIONS

Nishida, S., et al., "Photothermal excitation and laser Doppler velocimetry of higher cantilever vibration modes for dynamic atomic force microscopy in liquid", Review of Scientific Instruments, 2008, p. 123703, vol. 79.

(Continued)

*Primary Examiner* — Natalie Huls
(74) *Attorney, Agent, or Firm* — Office of Chief Counsel for National Institute of Standards and Technology

(57) ABSTRACT

Apparatus and method for measuring a vibration spectra of a sample using microscope-based Laser Doppler Vibrometer (LDV), where photothermal actuation uses pulsed light to drive vibrations without contact with the sample.

8 Claims, 4 Drawing Sheets

(56) References Cited

OTHER PUBLICATIONS

International Search Report from PCT/US2023/012053 file date Jan. 31, 2023.

Xiong, L., et al., "New laser excitation method for modal analysis of microstructure" Mechanical Systems and Signal Processing, 2015, p. 227-234, vol. 50-51.

Fu, Y., et al., "Standoff photoacoustic sensing of trace chemicals by laser Doppler vibrometer", Proceedings of SPIE, 2016, p. 98240O, vol. 9824.

Hu, Q., et al., "Photo-vibrational spectroscopy of solid and liquid chemicals using laser Doppler vibrometer", Optics Express, 2016, p. 19148-19156, vol. 24 No. 17.

* cited by examiner

PHOTOTHERMAL ACTUATION OF VIBRATIONS FOR MEASUREMENTS USING LASER DOPPLER VIBROMETERS

CROSS REFERENCE TO RELATED APPLICATIONS

This application claims the benefit of U.S. Provisional Patent Application Ser. No. 63/305,083 (filed Jan. 31, 2022), which is herein incorporated by reference in its entirety.

This invention was made with United States Government support from the National Institute of Standards and Technology (NIST), an agency of the United States Department of Commerce. The Government has certain rights in this invention.

BRIEF DESCRIPTION

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

Laser Doppler Vibrometers (LDVs) are used to measure the vibration spectra of a variety of samples, including Micro Electro Mechanical Systems (MEMS). Traditional measurements at the vibrational modes of interest required actuation by methods including physical impact with a sample or sample holder, shakers that vibrate the entire sample, or methods that otherwise required physical contact with the sample such as electrical connections required with the use of on-chip actuators. Photothermal actuation uses pulsed light to drive vibrations without contact with the sample, enabling easier, faster, and more accurate vibrational measurements of samples, including measurements of MEMS.

Disclosed is an apparatus for measuring a vibration spectra of a sample, comprising: a microscope-based Laser Doppler Vibrometer (LDV) configured to emit a signal laser beam and to receive a reflected laser beam; a drive laser source configured to emit a drive laser beam; a control system configured to control a frequency of emission of the drive laser beam; and a beam combination setup in optical communication with the LDV, the drive laser source, and the sample; wherein the beam combination setup further comprises: a dichroic mirror configured to preference the transmission of the signal laser beam from the LDV to the sample and the reflected laser beam from the sample to the LDV, and to preference the reflection of the drive laser beam from the drive laser source to the sample; and an edge filter positioned between the dichroic mirror and the LDV; and wherein the wavelengths of the signal laser beam and the drive laser beam are selected to allow for the drive laser beam to be spectrally separated from the signal laser beam such that the modulation of the reflected laser beam returned through the dichroic mirror and the edge filter to the LDV is detectable.

Disclosed is a process for measuring a vibration spectra of a sample, the process comprising: producing, by a Laser Doppler Vibrometer (LDV), a signal laser beam; subjecting a sample to the signal laser beam by transmitting the signal laser beam through, first, an edge filter, and second, a dichroic mirror; producing, by a drive laser source, a drive laser beam; controlling the drive laser beam to be emitted at a chosen frequency; subjecting the sample to the drive laser beam by reflecting the drive laser beam with the dichroic mirror; vibrating the sample at a sample vibration frequency; producing a reflected laser beam from the signal laser beam which was reflected from the sample; and receiving, by the LDV, the reflected laser beam by transmitting the reflected laser beam through, first, the dichroic mirror, and second, the edge filter.

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

Figure 1:
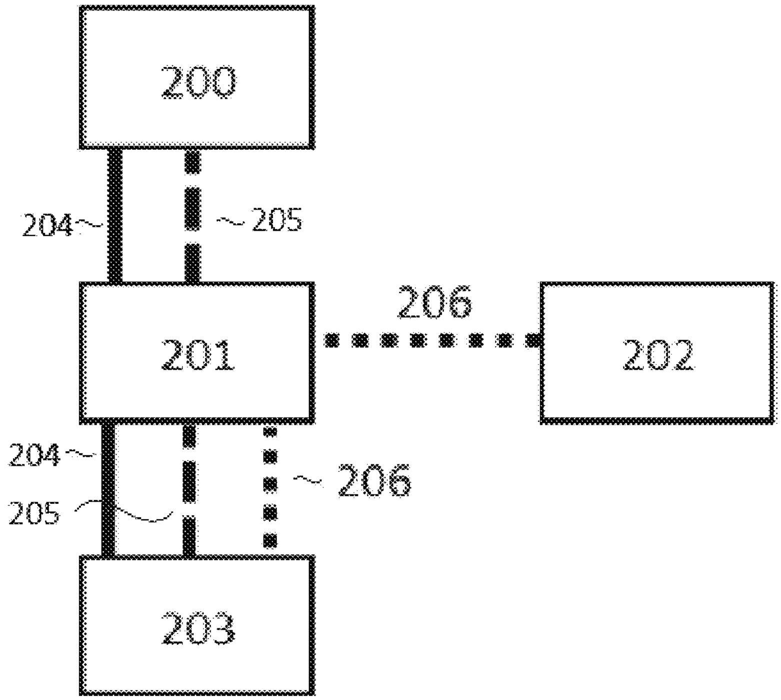
FIG. 1 shows a laser doppler vibrometer configured to measure photothermal actuated vibrations of a sample using a drive laser source and a beam combination setup, according to some embodiments.

A detailed description of one or more embodiments is presented herein by way of exemplification and not limitation.

It has been discovered that limitations of traditional methods of laser doppler vibrometry which required actuation by methods including physical impact with a sample or sample holder, shakers that vibrate the entire sample, or methods that otherwise required physical contact with the sample such as electrical connections required with the use of on-chip actuators may be overcome by the use of photothermal actuation of the sample. This invention contemplates that photothermal actuation, in which a sufficiently powerful drive light source such as a drive laser beam or driving light emitting diode, is capable of providing the necessary vibration for measurements made by Laser Doppler Vibrometry without requiring physical contact with the sample.

Laser doppler vibrometer 200 performs laser doppler vibrometry. In several embodiments, with reference to FIG. 1, FIG. 2, FIG. 3, and FIG. 4, laser doppler vibrometer 200 can be any laser doppler vibrometry system configured to emit a signal laser beam 204 and receive a reflected laser beam 205. Both signal laser beam 204 and reflected laser beam 205 are transmitted through beam combination setup 201 to sample 203. Drive laser source 202 produces drive laser beam 206, which is emitted at a chosen frequency and which travels through beam combination setup 201 to sample 203, where the interaction between drive laser beam 206 and sample 203 causes sample 203 to vibrate. On receipt of reflected laser beam 205 which is modulated by the vibration of sample 203, laser doppler vibrometer 200 targeted vibration measurements of sample 203 are calculated by standard means.

Figure 2:
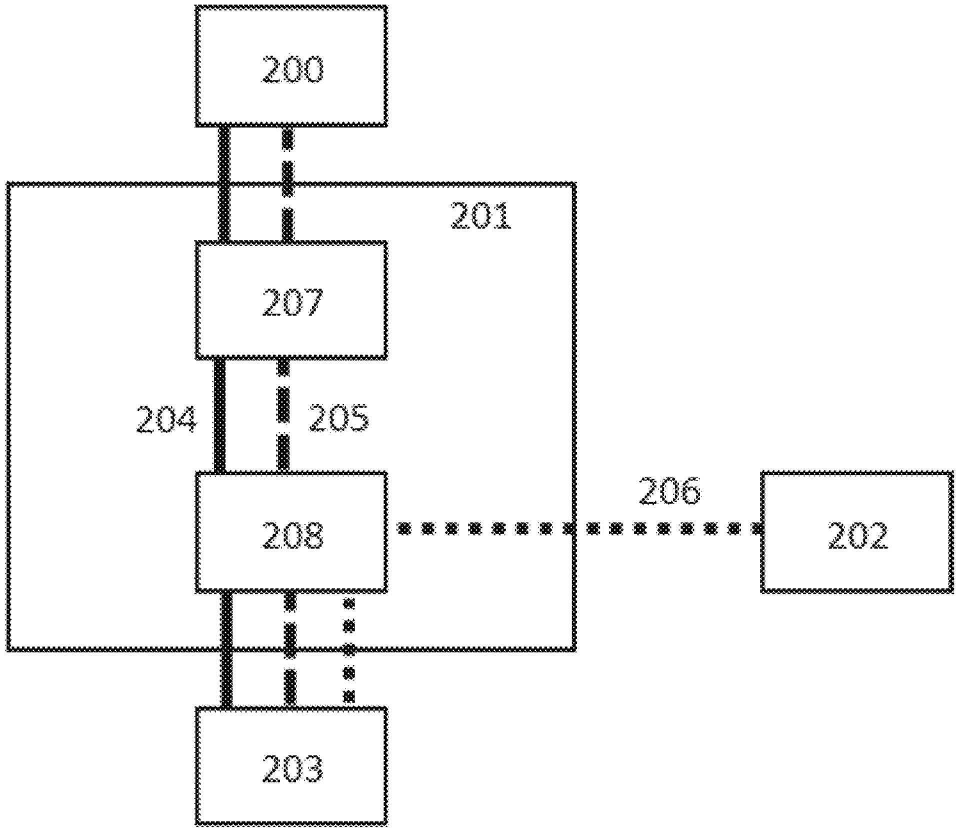
FIG. 2 shows the laser doppler vibrometer of FIG. 1 with an exploded view of the beam combination setup, according to some embodiments.
Figure 3:
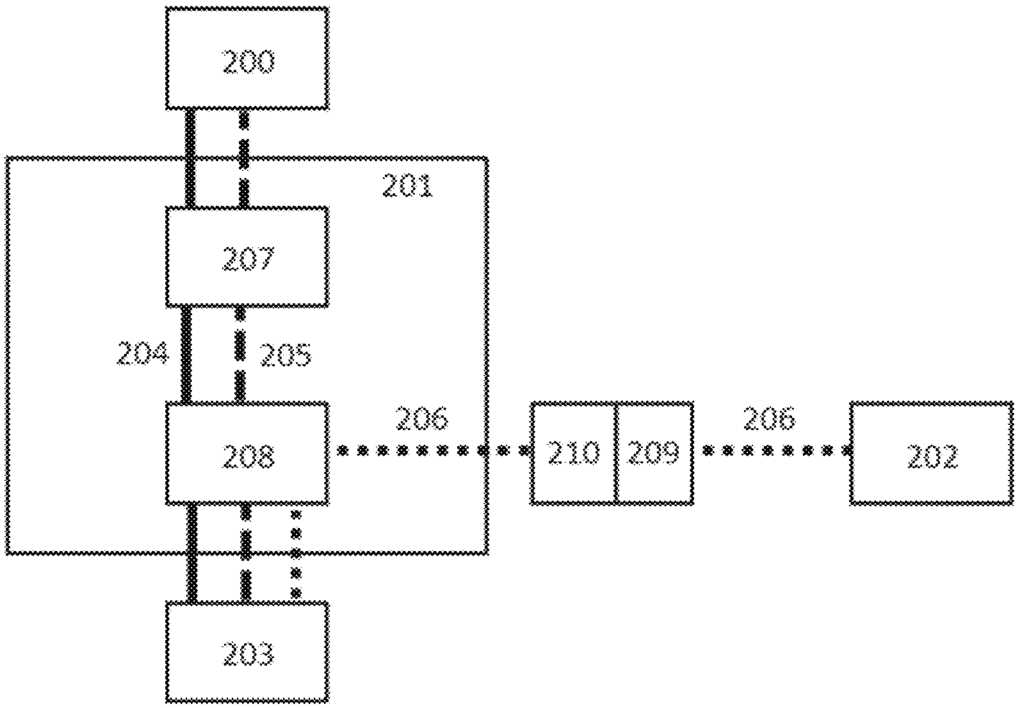
FIG. 3 shows a laser doppler vibrometer configured to measure photothermal actuated vibrations of a sample using a drive laser source and a beam combination setup, wherein the drive laser beam is transmitted through a collimator and beam steerer to allow for precise targeting of the drive laser beam on the sample, according to some embodiments.
Figure 4:
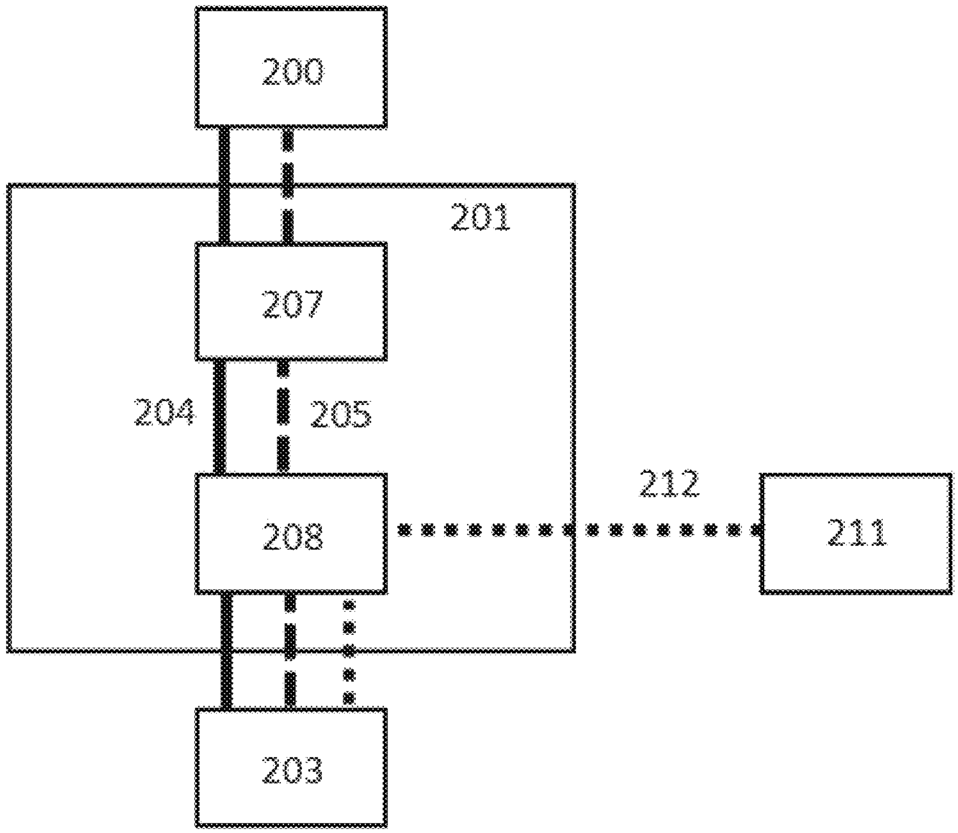
FIG. 4 shows a laser doppler vibrometer configured to measure photothermal actuated vibrations of a sample using a light emitting diode and a beam combination setup, according to some embodiments.

In certain embodiments, with reference to FIG. 2, FIG. 3, and FIG. 4, within beam combination setup 201, signal laser beam 204 is first transmitted through edge filter 207, then dichroic mirror 208, before contacting sample 203. Next, reflected laser beam 205 is transmitted from sample 203 through dichroic mirror 208, then through edge filter 207 before being received by laser doppler vibrometer 200. Meanwhile, drive laser beam 206 enters beam combination setup 201 and is reflected by dichroic mirror 208 towards sample 203.

In other embodiments, with reference to FIG. 3, drive laser beam 206 is passed first through collimator 209 and then interacts with beam steerer 210, allowing the precise targeting of drive laser beam 206 on sample 203, whereas use without collimator 209 and beam steerer 210 can allow for wide field actuation over the entire visible area of the sample.

In certain embodiments, with reference to FIG. 4, a sufficiently powerful light emitting diode 211 emits drive light beam 212, which enters beam combination setup 201 and is reflected by dichroic mirror 208 towards sample 203.

In certain embodiments, the wavelengths of the signal laser beam and the drive laser beam are selected to allow for the drive laser beam to be spectrally separated from the signal laser beam such that the modulation of the reflected laser beam returned through the dichroic mirror and the edge filter to the LDV is detectable.

In certain embodiments, the edge filter is a long-pass filter. In certain of these embodiments, signal laser beam 204 is red and drive laser beam 206 or drive light beam 212 is blue.

In certain embodiments, the edge filter is a short-pass filter. In certain of these embodiments, signal laser beam 204 is blue and drive laser beam 206 or drive light beam 212 is red.

In certain embodiments, drive laser source 202 or light emitting diode 211 is controlled to periodically emit drive laser beam 206 or drive light beam 212. In certain of these embodiments, the control is electronic allowing for precise selection of the frequency of the emitted light. In certain of these embodiments, the control is analog. In certain of these embodiments, the control allows for periodic emission of a continuous light source with a triggerable output. In certain of these embodiments, light emission is triggered by acoustic optical modulation.

In certain embodiments, drive laser source 202 is a pulsed laser.

In certain embodiments, drive laser beam 206 is transmitted to sample 203 directly without passing through beam combination setup 201 or being reflected by dichroic mirror 208.

In certain embodiments, the measurements made by laser doppler vibrometer 200 include mode shape mapping of MEMS devices.

In certain embodiments, the measurements made by laser doppler vibrometer 200 are used for the calibration of accelerometers at high accuracy.

The invention as contemplated and disclosed herein has numerous beneficial uses, including allowing for the easier, faster, and more accurate vibrational measurements of samples in which traditional actuation techniques are inappropriate or have significant drawbacks, including specifically the measurement of Micro Electrical Mechanical Systems (MEMS). For example, shaker table actuation, while relatively simple and low cost, is imprecise for the measurement of MEMS. Because MEMS devices typically have resonant/operational frequencies that are well above the first resonance of a shaker table assembly, the base actuation of the device under test is substantially more complicated than the single sine wave function the generator is producing. The possibility of having an on-chip actuator overcomes some issues with precision, but this is costly as such a solution typically requires the integration of an LDV with a probe station to provide electrical connection to the actuator and requires the MEMS device to be designed with contact pads large enough for use with a probe station. Further measurement time is slow per device because probes must be pulled out of contact before translating to another device and making contact again.

Advantageously, the present invention including beam combination setup 201 and sample 203 overcomes these limitations and technical deficiencies of conventional devices and conventional processes by allowing for precise, efficient measurements of devices such as MEMS to be made without requiring expensive design or re-design of the MEMS device or time-inefficiencies involved with the use of a probe station.

The apparatuses and processes herein are illustrated further by the following Example, which is non-limiting.

EXAMPLE

A device as generally illustrated in FIG. 2 was assembled. Drive laser source 202 was a continuous blue laser which was frequency controlled by digitally modulation such that drive laser beam 206 was periodically entirely on or off. Edge filter 207 was a long-pass filter, and dichroic mirror 208 was selected to prefer transmission of red light and reflection of blue light. Laser doppler vibrometer 200 was configured to emit red light. This system was assembled such that signal laser beam 204 and drive laser beam 206 were optically coaxial. Beam combination setup 201 was effectively an attachment to the microscope side of the objective lens of laser doppler vibrometer 200.

Testing demonstrated photothermal actuation in driving vibrations of MEMS samples at actuation bandwidths of up to 2 Mhz.

Testing demonstrated photothermal actuation driving vibration displacements of larger than 1 nm for tested full size MEMS devices.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive, rather the elements can be used separately or can be combined together under appropriate circumstances.

The invention claimed is:

1. An apparatus for measuring a vibration spectra of a sample, comprising:

a microscope-based Laser Doppler Vibrometer (LDV) configured to emit a signal laser beam and to receive a reflected laser beam;

a drive laser source configured to emit a drive laser beam;

a control system configured to control a frequency of emission of the drive laser beam;

a beam combination setup in optical communication with the LDV, the drive laser source, and the sample;

wherein the beam combination setup further comprises: a dichroic mirror configured to preference the transmission of the signal laser beam from the LDV to the sample and the reflected laser beam from the sample to the LDV, and to preference the reflection of the drive laser beam from the drive laser source to the sample; and an edge filter positioned between the dichroic mirror and the LDV.

2. The apparatus of claim 1, wherein the wavelengths of the signal laser beam and the drive laser beam are selected to allow for the drive laser beam to be spectrally separated from the signal laser beam such that the modulation of the reflected laser beam returned through the dichroic mirror and the edge filter to the LDV is detectable.

3. The apparatus of claim 2, wherein the drive laser beam is passed first through a collimator and then interacts with a beam steerer, allowing the precise targeting of drive laser beam on the sample.

4. The apparatus of claim 2, wherein the drive laser beam is spread to allow for wide field actuation over the entire visible area of the sample.

5. A process for measuring a vibration spectra of a sample, the process comprising:

producing, by a Laser Doppler Vibrometer (LDV), a signal laser beam;

controlling the signal laser beam to be emitted at a chosen frequency;

subjecting a sample to the signal laser beam by transmitting the signal laser beam through, first, an edge filter, and second, a dichroic mirror;

producing, by a drive laser source, a drive laser beam;

controlling the drive laser beam to be emitted at a chosen frequency;

subjecting the sample to the drive laser beam by reflecting the drive laser beam with the dichroic mirror;

the drive laser beam vibrating the sample at a sample vibration frequency;

producing a reflected laser beam from the signal laser beam which was reflected from the sample; and receiving, by the LDV, the reflected laser beam by transmitting the reflected laser beam through, first, the dichroic mirror, and second, the edge filter.

6. The process of claim 5, wherein the signal laser beam and drive laser beam are controlled to be emitted at separate chosen frequencies which allow for the drive laser beam to be spectrally separated from the signal laser beam such that the modulation of the reflected laser beam returned through the dichroic mirror and the edge filter to the LDV is detectable.

7. The process of claim 6, wherein the drive laser beam is additionally passed through first, a collimator, and then interacts with a beam steerer, allowing the precise targeting of drive laser beam on the sample.

8. The process of claim 6, wherein the drive laser beam is spread to allow for wide field actuation over the entire visible area of the sample.

* * * * *